United States Patent [19]
Barr et al.

[11] Patent Number: 4,995,887
[45] Date of Patent: Feb. 26, 1991

[54] CUTTING ELEMENTS FOR ROTARY DRILL BITS

[75] Inventors: John D. Barr, Cheltenham, England; Thomas A. Newton, Jr., Houston, Tex.

[73] Assignee: Reed Tool Company Limited, Gloucestershire, England

[21] Appl. No.: 333,297

[22] Filed: Apr. 4, 1989

[30] Foreign Application Priority Data

Apr. 5, 1988 [GB] United Kingdom ................ 8807875
Nov. 15, 1988 [GB] United Kingdom ................ 8826672

[51] Int. Cl.5 ................................................ B24B 1/00
[52] U.S. Cl. .......................................... 51/295; 51/293
[58] Field of Search .................................. 51/293, 295

[56] References Cited

U.S. PATENT DOCUMENTS

| | | | |
|---|---|---|---|
| 4,219,339 | 8/1980 | Wilson | 51/307 |
| 4,225,322 | 9/1980 | Kremeyer | 51/295 |
| 4,255,165 | 3/1981 | Dennis et al. | 51/309 |
| 4,259,090 | 3/1981 | Bovenkerk | 51/309 |
| 4,505,342 | 3/1985 | Barr et al. | 175/329 |
| 4,539,018 | 9/1985 | Whanger et al. | 51/295 |
| 4,694,918 | 9/1987 | Hall | 51/293 |

Primary Examiner—Karl Group
Assistant Examiner—W. J. Thompson
Attorney, Agent, or Firm—Browning, Bushman, Anderson & Brookhart

[57] ABSTRACT

A cutting element for a rotary drill bit comprises a layer of polycrystalline diamond material having a front face and a rear face, a backing layer of less hard material bonded to the rear face of the diamond layer, and a front layer of less hard material bonded to the front face of the diamond layer and extending across at least the major part thereof. The front layer is thinner than the backing layer, at least in the vicinity of the cutting edge of the cutting element.

38 Claims, 4 Drawing Sheets

CUTTING ELEMENTS FOR ROTARY DRILL BITS

BACKGROUND OF THE INVENTION

The invention relates to cutting elements for rotary drill bits for drilling or coring holes in subsurface formations. It relates in particular to drill bits which comprise a bit body having a shank for connection to a drill string, an operating end face on which are mounted a plurality of so called "preform" cutting elements, and a passage for supplying drilling fluid to the operating face of the bit for cooling and/or cleaning the cutting elements.

Each preform cutting element normally comprises a thin hard facing layer, which defines the front cutting face of the element, bonded to a less hard backing layer. For example, the hard facing layer may be formed of polycrystalline diamond or other superhard material, and the backing layer may be formed of cemented tungsten carbide. The two-layer arrangement of the cutting elements provides a degree of self-sharpening since, in use, the less hard backing layer wears away more easily than the harder cutting layer. The preform cutting elements are usually mounted on the bit body by being bonded, for example by brazing, to a carrier which may be in the form of a stud of tungsten carbide which is secured in a socket in the bit body.

The two-layer preforms may be manufactured by hot pressing, with a cobalt catalyst, a layer of polycrystalline diamond material and a layer of tungsten carbide in a high pressure, high temperature press. Methods of manufacturing such preforms are described, for example, in U.S. Pat. No. 4,259,090.

The cutting elements are normally so mounted on the drill bit that they engage the surface of the formation being drilled with the front cutting face of the diamond layer inclined at an angle to the surface of the formation. If the cutting element is orientated so that its front cutting face is inclined rearwardly, as it extends away from the formation, with respect to forward movement of the cutting element, this is referred to as "positive back-rake". It is found that when a bit having such elements is used to drill through rock, the positive back-rake can give more efficient cutting. However, experiments in rock cutting with such cutting elements have shown it to give an unacceptably high incidence of failure of the cutting elements due to fracture near the cutting edge. This high incidence of fracture is believed to be due to the high tensile stress in the diamond layer at the cutting edge due to the positive back-rake. For this reason it is common to use negative back-rake of from $-5°$ to $-20°$, that is to say to incline the front cutting face of the cutting element forwardly, as it extends away from the formation, with respect to the normal forward direction of movement of the cutting element during drilling. This is found to reduce the incidence of failure due to tensile stress in the diamond layer, but at the cost of less efficient cutting performance.

U.S. Pat. No. 4,255,165 discloses a number of designs of composite compacts each comprising a plurality of cemented carbide masses bonded to and interleaved with a plurality of masses of polycrystalline material, such as polycrystalline diamond material. The carbide masses are generally substantially equal in thickness to one another and the primary object of the arrangements described is to result in the spaced masses of polycrystalline diamond forming spaced claw-like cutting fingers, as the carbide between them wears down, to provide a more effective cutting action. In order to achieve the required result, the cutting surface of each compact must extend transversely to the alternating masses of carbide and polycrystalline material. Thus, although the compacts incorporate two or more layers of carbide, such compacts are of a basically different type from the preform cutting elements of the kind to which the present invention relates.

The present invention sets out, in one aspect thereof, to provide an improved preform cutting element which may allow more positive back-rake to be used, at least in the vicinity of the cutting edge, thus allowing more efficient cutting, without the increased tendency to failure for the reasons referred to above.

SUMMARY OF THE INVENTION

According to the invention there is provided a cutting element for a rotary drill bit comprising a layer of polycrystalline diamond material having a front face and a rear face, a backing layer of less hard material bonded to the rear face of the diamond layer, and a front layer of less hard material bonded to the front face of the diamond layer and extending across at least the major part thereof, the front layer being thinner than the backing layer, at least in the vicinity of the cutting edge.

Since the less hard material of the front layer may then have better toughness in tension than the diamond layer, this may enable the cutting element better to resist tensile stress and thus allow a more positive back-rake of the diamond layer to be used.

Preferably the front layer of the cutting element extends across substantially the whole of the diamond layer.

The diamond layer may be substantially continuous. Alternatively, however, the diamond layer may be formed with a plurality of apertures into which extends the material of the front and/or backing layer. Alternatively, the diamond layer may comprise a plurality of discrete and separate elements, such as rods or strips, spaced apart in a common plane so as to provide between the elements spaces into which extends the material of the front and/or backing layers.

The diamond layer may extend across only a part of the backing layer and the front layer respectively. In this case the portions of the backing layer and front layer across which the diamond layer does not lie preferably extend across the peripheral edge of the diamond layer and are bonded together.

Preferably the front and backing layers are formed of the same material. In this case, in the areas where the front and backing layers are in contact, said layers are preferably integrally bonded together to form a unified whole in which the diamond layer is, in effect, embedded.

The diamond layer may lie in a substantially flat plane or the front and/or rear surface thereof may be convexly or concavely curved.

The diamond layer is preferably of substantially constant thickness.

The general plane of the diamond layer may be disposed at an angle to the general plane of the front surface of the front layer. For example, the front surface of the front layer and the front surface of the diamond layer may each be substantially flat, said surfaces being inclined at an acute angle to one another. In this case the front surface of the diamond layer may intersect the front surface of the front layer, preferably at or adjacent a peripheral edge of the front layer.

Preferably the rear surface of the backing layer is substantially parallel to the front surface of the front layer.

The diamond layer may comprise polycrystalline diamond hot-pressed with a catalyst, e.g. cobalt, and the front and backing layers may each comprise cemented tungsten carbide hot-pressed with a binder, which may also be cobalt.

The invention includes within its scope a cutting structure comprising a cutting element of any of the kinds referred to above bonded, for example by brazing, to a carrier, such as a stud of cemented tungsten carbide.

The invention also includes within its scope a rotary drill bit having an operating surface on which are mounted cutting elements or cutting structures of any of the kinds referred to above.

Cutting elements are known in which a generally concave facing layer of polycrystalline diamond, providing a concave front cutting surface, is bonded to a thicker backing layer of cemented tungsten carbide. The concavity of the front face of the diamond layer may have functional advantage in use since it can have the effect of varying the back-rake of the cutting element with distance from the cutting edge. Thus, the concavity of the surface provides increasingly negative back-rake as the cutting element wears in use. However, difficulties have been experienced in manufacturing cutting elements having concave diamond facing layers. This is believed to be due to the fact that the extreme high pressure, high temperature presses required to hot-press the two-layer preforms are normally designed to produce a tablet-like preform of substantially constant thickness having flat front and rear surfaces.

Besides the above mentioned difficulties of manufacture, difficulties are also experienced in bonding concave-faced cutting elements to a carrier. The cutting element may be required to be bonded to a hard carrier, for example of tungsten carbide, by a high strength bond. Currently the most successful bonding process is a process known as "LS" bonding which requires the coupling of a heat sink to the diamond layer to prevent thermal degradation of the layer as a result of the high temperature of bonding of the backing layer to the carrier. This bonding method is described in U.S. Pat. No. 4,225,322. To achieve an efficient transfer of heat from the diamond layer it is necessary for the surface of the heat sink to be in close contact with the front surface of the diamond layer. While good conformity with a flat surface layer can fairly readily be achieved, it can be extremely difficult to obtain good conformity with a curved diamond layer.

The present invention provides, in another of its aspects, an improved method of forming preform cutting elements which is particularly, but not exclusively, applicable to the formation of preforms with concave, or other non-planar, front surfaces.

According to this aspect of the invention there is provided a method of forming a cutting element for use in a rotary drill bit comprising the steps of forming in a high temperature, high pressure press an interim structure comprising a layer of polycrystalline diamond material having a front face and rear face, a backing layer of less hard material bonded to the rear face of the diamond layer, and a front layer of less hard material bonded to the front face of the diamond layer and extending across at least the major part thereof, removing the interim structure from the press and then removing from the interim structure at least part of the front layer.

The front layer, or part thereof, may be removed by grinding. Sufficient of the front layer may be removed to reveal all or part of the front surface of the diamond layer.

Accordingly, the interim structure may be of substantially constant thickness and may have substantially flat front and rear surfaces so that it may be formed in a conventional high temperature, high pressure press. The shape of the diamond layer can then be according to any requirement. Removal of the whole of the front layer of the interim structure will result in a two-layer cutting element of known configuration, comprising a thin diamond layer, providing a front cutting face, bonded to a thicker backing layer. However, removal of only part of the front layer will result in a cutting element according to the first aspect of the present invention since a front layer of less hard material will still extend over at least part of the diamond layer.

In the case where the cutting element requires to be bonded to a carrier, for example by "LS" bonding as described above, the interim structure may be bonded to the carrier before removal, or part-removal, of the front layer of less hard material. The front layer may then be readily ground flat for close conformity with the heat sink, as required for LS bonding, and after bonding has been effected the front layer is then totally or partly removed to reveal the curved front surface of the diamond layer. The invention may also be beneficial even where the diamond layer is flat, since the front surface of the less hard material can be more easily ground smooth, to conform to the heat sink, than the front surface of the exposed diamond layer in a conventional cutting element.

DETAILED DESCRIPTION OF THE PREFERRED EMBODIMENTS

Figure 1:
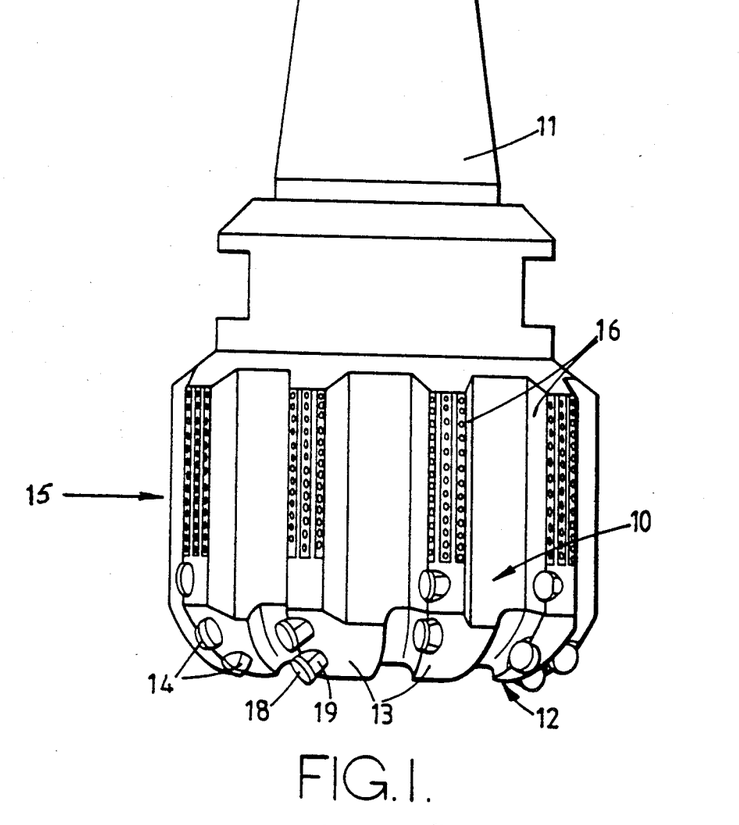
FIG. 1 is a side elevation of a typical drill bit of the kind to which the invention is applicable.
Figure 2:
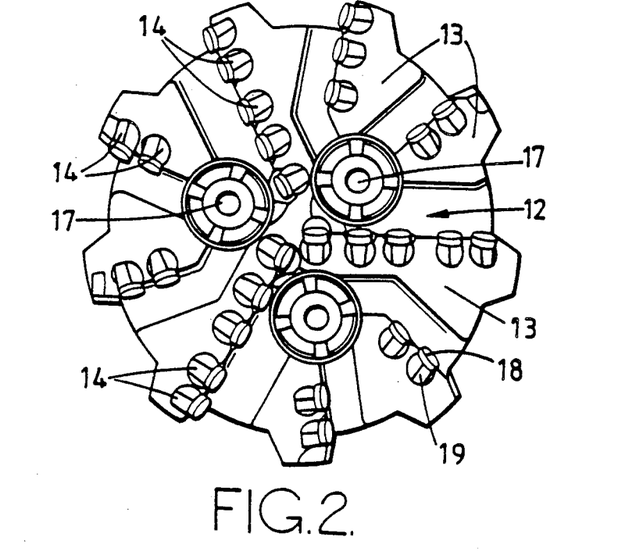
FIG. 2 is an end elevation of the drill bit shown in FIG. 1.

Referring to FIGS. 1 and 2, these show a full bore drill bit of a kind to which the present invention is applicable.

The bit body 10 is typically moulded from tungsten carbide matrix infiltrated with a binder alloy, and has a threaded shank 11 at one end for connection to the drill string.

The operative end face 12 of the bit body is formed with a number of blades 13 radiating from the central area of the bit, the blades carrying cutting structures 14 spaced apart along the length thereof.

The bit gauge section 15 includes kickers 16 which contact the walls of the borehole to stabilise the bit in the borehole. A central passage (not shown) in the bit body and shank delivers drilling fluid through nozzles 17 to the end face 12 in known manner.

It will be appreciated that this is only one example of many possible variations of the type of bit to which the invention is applicable, including bits where the body is formed from steel.

In such drill bits, each cutting structure 14 may comprise a preform cutting element 18 mounted on a carrier 19 in the form of a stud which is secured in a socket in the bit body. Each preform cutting element 18 may be circular.

Hitherto, such preform cutting elements have normally been two-layer elements comprising a front facing layer of polycrystalline diamond, providing the front cutting face of the element, bonded to a backing layer of cemented tungsten carbide.

Figure 3:
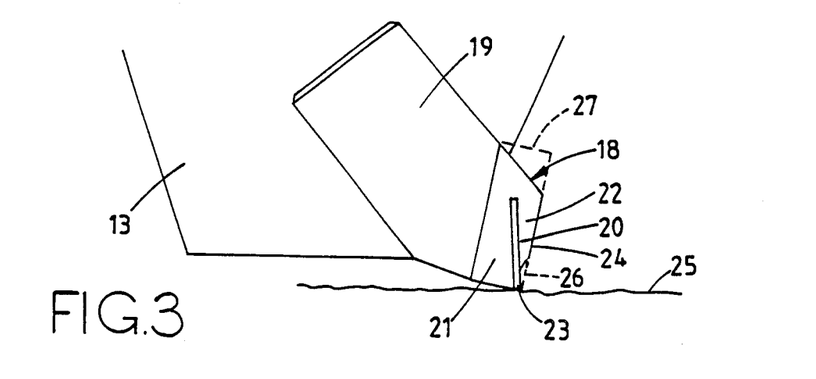
FIG. 3 is a diagrammatic side elevation of a cutting structure incorporating a cutting element according to the invention.

FIG. 3 illustrates diagrammatically one form of cutting element 18 according to the invention which comprises a polycrystalline diamond layer 20 of constant thickness embedded in cemented tungsten carbide which thereby provides a backing layer 21 bonded to the rear face of the diamond layer, and a front layer 22 bonded to the front face of the diamond layer. The diamond layer 20 does not extend across the whole diameter of the cutting element so that the front and rear tungsten carbide layers extend across the upper peripheral edge of the diamond layer to form a unitary body of material.

It will be seen that the front surface of the front layer 22 and the rear surface of the backing layer 21 are flat and substantially parallel. However, the diamond layer 20 extends at an acute angle to the front surface of the front layer 22 so that the diamond layer intersects the front surface of the front layer at the lower periphery thereof to form the cutting edge 23 of the cutting element. In the vicinity of the cutting edge 23 the front layer 22 is considerably thinner than the backing layer 21.

As may be seen from FIG. 3, the front surface 24 of the front layer 22 of the cutting element is inclined at negative back-rake, that is to say, it leans forwardly, as it extends away from the formation 25, in the direction of normal forward movement of the cutting element in use. The diamond layer 20, however, being inclined at an acute angle to the front face of the front layer 22, may have less negative back-rake or may even have positive back-rake, while still maintaining the negative back-rake of the surface 24.

It is believed that such arrangement subjects the diamond layer to less tensile stress than arrangements where the diamond layer is disposed at a similar back-rake angle, but provides the front face of the cutting element.

In use, the part of the front layer 22 adjacent the cutting edge 23 is likely to erode away, as indicated at 26. This can provide a self-sharpening effect as the cutting element wears down.

There may be advantage in providing a cutting element which does not project beyond the peripheral boundary of the stud on which it is mounted, as viewed axially of the stud. For example, this may permit part of the cutting element to be received in the socket without the necessity of providing additional relief at the mouth of the socket to receive the projecting part of the cutting element. Such an arrangement is shown in FIG. 3. In order to achieve the necessary construction, it may be desirable to mount a complete circular cutting element on the inclined surface on the stud and then to remove, for example by grinding, those parts of the cutting element which project beyond the periphery of the stud, as viewed axially. FIG. 3 shows in dotted lines, at 27, the part of the circular tablet which must be ground off in such a case. It will be seen that the diamond layer 20 does not extend into the part of the cutting element which must be ground off, and this facilitates the grinding operation.

Figure 4:
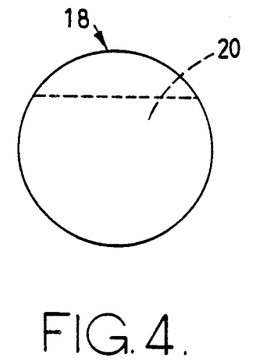
FIG. 4 is a front elevation of the cutting element of FIG. 3, FIGS. 5 and 6 are similar views to FIG. 4 of alternative configurations of cutting element.

FIG. 4 is a front elevation of the circular cutting element 18 of FIG. 3, before the grinding off of the portion 27, and shows that the diamond layer 20 is generally in the form of a circle with a segment removed.

Figure 5:
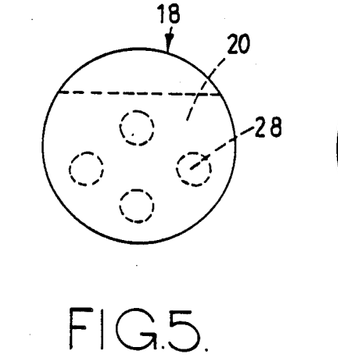

In the modified arrangement shown in FIG. 5, the diamond layer 20 is formed with a plurality of circular apertures 28 which place the front layer 22 in communication with the backing layer 21 so that the two layers are bonded together through the apertures and serve to key and lock the diamond layer within the cutting element.

Figure 6:
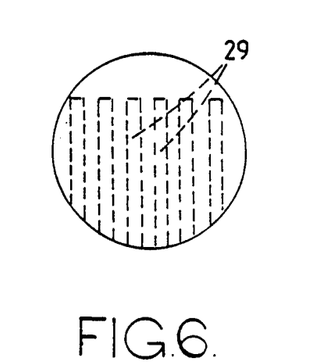

FIG. 6 shows an alternative arrangement wherein the diamond layer comprises a plurality of separate spaced parallel strips or rods 29. In this case the front layer 22 and backing layer 21 are bonded together through the spaces between the strips or rods 29. In each case the front layer is thinner than the backing layer, at least in the vicinity of the cutting edge of the element.

Figure 7:
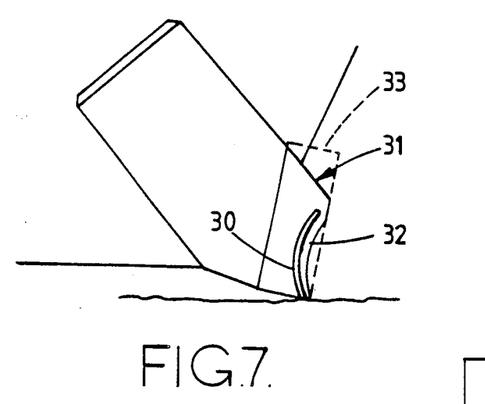
FIG. 7 is a diagrammatic side elevation of a further form of cutting structure incorporating a cutting element according to the invention.

FIG. 7 shows an alternative construction in which the diamond layer 30 of the cutting element 31 is curved so as to provide a concave front face and a convex rear face. The front layer 32 of the cutting element is similarly concavely curved, and the advantages of such concave curvature have been referred to earlier.

Figure 8:
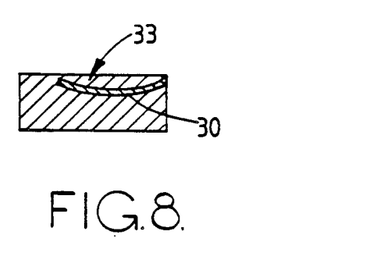
FIG. 8 is a diagrammatic section through an interim structure used in a process for manufacturing the cutting element of FIG. 7.

There is indicated in dotted lines at 33 the outline of the interim structure from which the cutting element 31 of FIG. 7 has been formed, and the interim structure is also shown in FIG. 8. It will be seen from FIG. 8 that the interim structure 33 comprises overall a circular tablet of constant thickness having flat parallel front and rear faces. The main body of the tablet is formed from cemented tungsten carbide and the polycrystalline diamond layer is embedded within the main body of tungsten carbide. Such an interim structure may be formed in a conventional high pressure, high temperature press of the type normally used for the hot pressing of two-layer polycrystalline diamond and tungsten carbide preforms. Such an element may be manufactured using the known techniques.

The element of FIG. 8 may be used without further modification and the cutting element of FIG. 3 would be formed by a similar process. However, in the arrangement of FIG. 7 part of the front face of the element 33 has been ground away so that the front layer 32 is thinner and provides a concave front face to the cutting element 31.

The front layer 32 might be further ground away to reveal part of the front face of the diamond layer 30 or it may be wholly ground away to reveal the whole of the front face of the diamond layer 30. In the latter case the final configuration of the cutting element 31 will be of a kind which has known to be desirable but which has hitherto been difficult to manufacture. The present invention therefore provides, in this aspect, an improved method of manufacture of such a cutting element.

Figure 9:
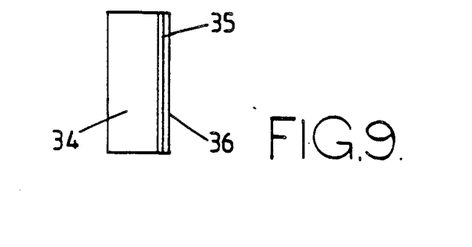
FIG. 9 is a side elevation of a still further form of cutting structure.

FIG. 9 shows a simple form of cutting element according to the invention where the backing layer 34, diamond layer 35 and front layer 36 are coextensive, parallel, and each of constant thickness. The cutting element may be used in the form shown in FIG. 9, but it may also be modified by removing or reshaping all or part of the front layer 36 and/or the backing layer 34.

FIGS. 10-13 illustrate another form of cutting element in accordance with the invention, and a method of manufacturing such an element.

Figure 10:
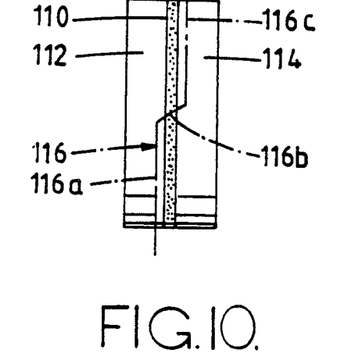
FIG. 10 is a side elevation of a preform intermediate structure from which two cutting elements according to the invention can be made.

FIG. 10 shows an intermediate structure for use in the manufacture of two cutting elements in accordance with the invention. The structure is generally in the form of a circular tablet or disc and comprises a layer 110 of polycrystalline diamond, to the two broad faces respectively of which are bonded somewhat thicker layers 112 and 114 of cemented tungsten carbide. Such a structure can be made in accordance with well known technology, and more specifically in the manner that traditional fully circular preform cutting elements are made, except that there are two layers 112 and 114 of tungsten carbide located on and bonded to respective faces of the polycrystalline diamond layer 110, rather than only a single tungsten carbide layer.

Figure 11:
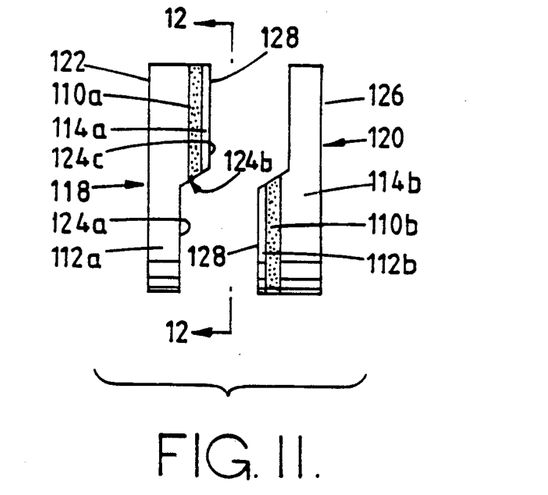
FIG. 11 is a side elevation of the structure of FIG. 10 after it has been cut and separated into two pieces.

Two cutting elements in accordance with the present invention can be formed from the intermediate structure of FIG. 10 by cutting along the chain line 116. The two resulting cutting elements are shown in FIG. 11 as items 118 and 120 respectively. It will be noted that the cutting line 116 has three parts: a first part 116a extends parallel to the broad faces of the layers 110, 112 and 114 and is positioned within layer 112, spaced from the adjacent surfaces of the diamond layer 110. This part 116a extends slightly less than half way across the structure. At that point, the cutting direction changes, through part 116b, which is angled so that it continues diametrically across the preform but also passes through the diamond layer 110 and slightly into the tungsten carbide layer 114. The upper end of the part 116b of the cut is located an equal distance from the top of the structure as its lower end is from the bottom. The top of the part 116b intersects the third part 116c of the cutting line, which, like part 116a, extends parallel to the broad faces of the layers of the structure, but spaced slightly from the adjacent face of the diamond layer 110.

Figure 12:
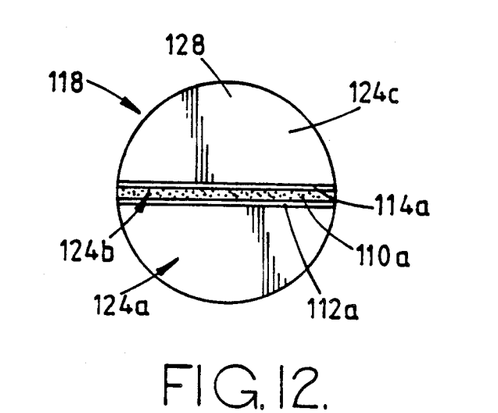
FIG. 12 is a front elevation of one of the cutting elements of FIG. 11 without the lapping or other removal of the thin forwardmost tungsten carbide layer.

After cutting, each of the elements 118 and 120 has a disc shape, i.e. defines a full circle, when viewed from the front or rear, as shown in the front view of the element 118 shown in FIG. 12. However, as best seen in FIG. 11, the thickness and composition of the cutting element 118 varies. More specifically, while the rear surface 122 of the element 118 is a planar surface, the front surface is a stepped surface including an innermost part 124a lying parallel to the rear surface 122, a bevelled step 124b, and a planar surface 124c, likewise lying parallel to, but further from, the rear surface 122.

It can also be seen that the element 118 includes portions of each of the three original layers 110, 112 and 114. More specifically, the rear layer 112a of the element includes the full thickness of layer 112 in its upper portion (the portion which, in use, engages the formation being cut) and parts of layer 112 of reduced thickness along the lowermost part of the step 124b as well as along the part 124a of the front surface. The uppermost or outermost part of the cutting element 118 also includes a generally semi-circular or half-disc-shaped portion 110a of the full thickness of the original diamond layer 110. Overlying the layer 110a along the outermost part of the front surface 124c is a thin layer of tungsten carbide 114a taken from the original layer 114.

The cutting element 120 is identical to the cutter 118, but is (as first cut) reversed in orientation, with its various parts being formed by the remainders of the three original layers 110, 112 and 114. Briefly, cutting element 120 has a planar rear face 126 and a stepped front face 128, along which the thickness of the cutting element as a whole varies. The rearmost layer of the element 120 includes a full circle portion 113b of tungsten carbide layer 114, the thickness of which is reduced along the innermost (in use) or uppermost (in FIG. 11) part of the cutting element, a semi-circular shaped full thickness portion 110b of the original diamond layer 110, and a thin semi-circular shaped layer 112b from the original tungsten carbide layer 112. Herein, unless otherwise noted, terms such as "outer" or "forward" refer to the orientation of the cutting element in use on a bit intended for rotation in a given direction as well known in the art.

If desired, the forwardmost thin tungsten carbide layers 114a and 112b of the cutting elements 118 and 120 respectively can be removed, for example by lapping, so that the diamond layers 110a and 110b are exposed on the forwardmost faces of the cutters from the outset. FIG. 14 shows the cutting element 118 after such lapping. However, in accordance with one aspect of the present invention it may be desirable to leave the layers 114a and 112b in place, and to allow them to be gradually worn away during drilling. It should be appreciated that the outermost portions of these layers, along the curves thereof, for example at 128 in FIGS. 11, 12 and 13, will very quickly wear away when drilling commences, so that a very hard cutting edge will be presented by the underlying diamond layer 110a.

Figure 13:
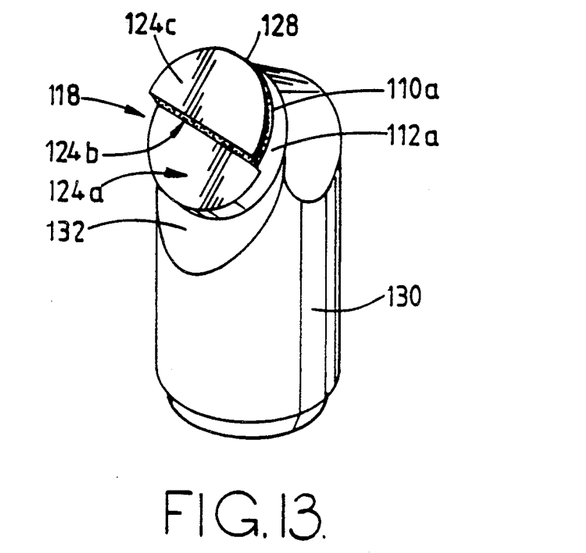
FIG. 13 is a perspective view showing how the cutting element of FIG. 12 could be mounted on a stud, which in turn can be mounted on a drill bit body.
Figure 14:
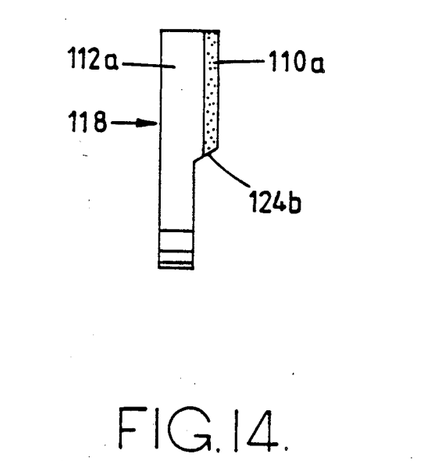
FIG. 14 is a side elevation of one of the cutting elements formed in accordance with FIGS. 10 and 11 but with the thin forwardmost layer of tungsten carbide having been removed, as by lapping.

FIG. 13 shows the cutting element 118 mounted on a carrier in the form of a stud 130, and more specifically on a planar angular surface 132 formed on the forward side of the stud 130 near its outermost end. It can be seen that, as thus positioned, the semi-circular layers 110a and 114a are disposed outermost and forwardmost, and their curved surfaces are presented at the free end of the stud to form the cutting edge.

Figure 15:
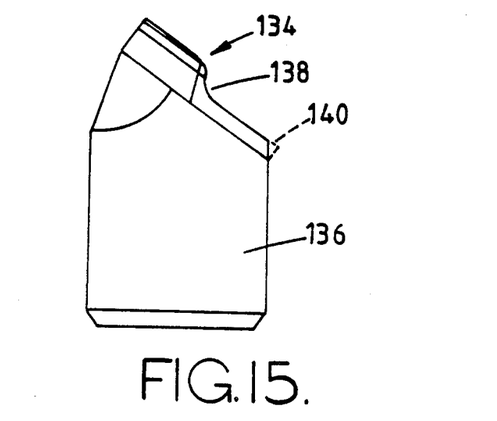
FIG. 15 is a side elevation of a further form of cutting element, in accordance with the invention, mounted on a stud.

FIG. 15 is a side elevation of an alternative form of cutting element 134, in accordance with the invention, mounted on a stud 136.

The element 134 is initially somewhat similar to the elements 118 and 120 but in this case the central portion of the cut which divides the intermediate structure follows a generally S-shaped path so that the step between the two parts of the cutting element is internally radiussed, as indicated at 138.

In the particular construction illustrated, the portions of the cutting element 134 which project beyond the periphery of the stud 136 as viewed axially, such portions being indicated in dotted line at 140 in FIG. 15, are ground off after the cutting element 134 has been mounted on the stud 136, for example by brazing.

Figure 16:
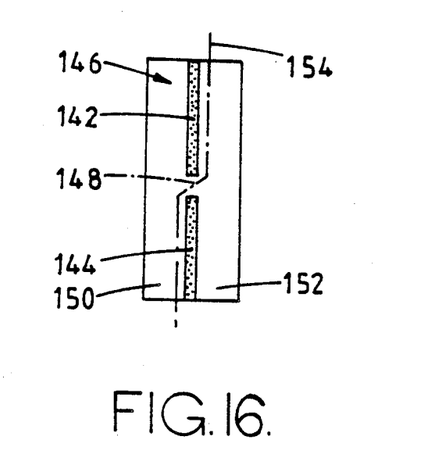
FIG. 16 is a side elevation of an alternative form of intermediate structure from which two cutting elements may be made.
Figure 17:
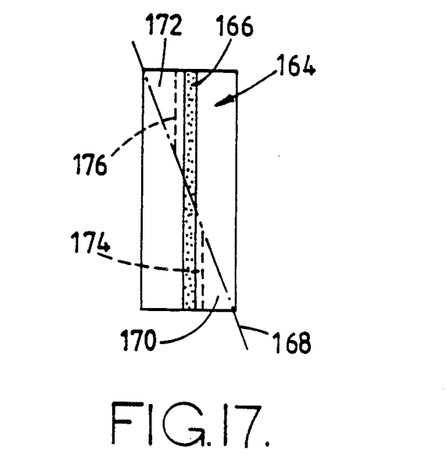
FIG. 17 is a similar view of a further form of intermediate structure.
Figure 19:
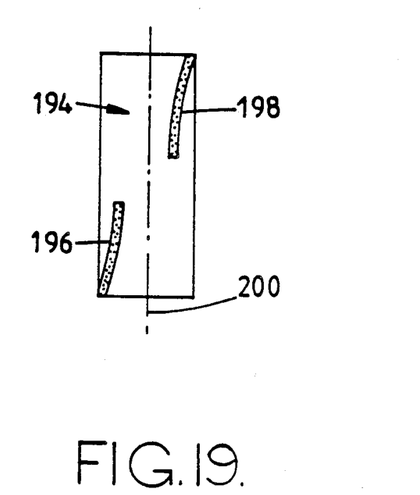
FIG. 19 is a side elevation of a still further form of intermediate structure.

FIGS. 16, 17 and 19 are similar views to FIG. 10 showing further alternative forms of intermediate structure from which two cutting elements may be made.

In the arrangement of FIG. 16, the diamond layer is formed in two coplanar portions 142 and 144, the two portions being spaced apart on opposite sides of a diameter of the intermediate structure 146 to provide an elongate gap 148 which is filled with tungsten carbide and connects the two outer layers 150 and 152. Such arrangement facilitates the cutting of the intermediate structure into two pieces since the cutting line 154 does not have to pass through polycrystalline diamond material but only through tungsten carbide. This speeds up the cutting process and hence reduces its cost. In all of the arrangements described the intermediate structure may be cut into two pieces using techniques, such as electron discharge machining, which are well known and do not therefore require to be described in detail.

As previously described, the thin layer of tungsten carbide which is left on the forward side of the diamond layer may be left in place, or may be removed in part or entirely, for example by lapping.

In the alternative arrangement of FIG. 17 the intermediate structure 164 incorporates a single diamond layer 166 and the structure is divided into two pieces by a straight cut 168 which, as viewed in FIG. 17, extends diagonally from one peripheral edge of the structure to the opposite peripheral edge. In this case the forward surface of each portion of the diamond layer will have bonded to it a generally wedge-shaped section of tungsten carbide as indicated at 170 and 172 in FIG. 17. This may be subsequently removed by grinding, either totally, so as to expose the forward face of the diamond layer, or down to the chain lines indicated at 174 and 176 in FIG. 17, so as to leave a thin layer of tungsten carbide in front of the diamond layer.

Although, as viewed in FIG. 17, the inclined line of cut 168 is shown as passing exactly through the opposite peripheral edges of the intermediate structure, it will be appreciated that this is not essential and the line of cut might intersect the opposite flat faces of the intermediate structure inwardly of the peripheral edge, or, alternatively, might intersect only the peripheral surface of the intermediate structure. Although it is desirable for the cut to be symmetrical so as to produce two substantially identical cutting elements, the invention does not exclude arrangements where the cut is not symmetrically located and thus produces two cutting elements of different sizes.

Figure 18:
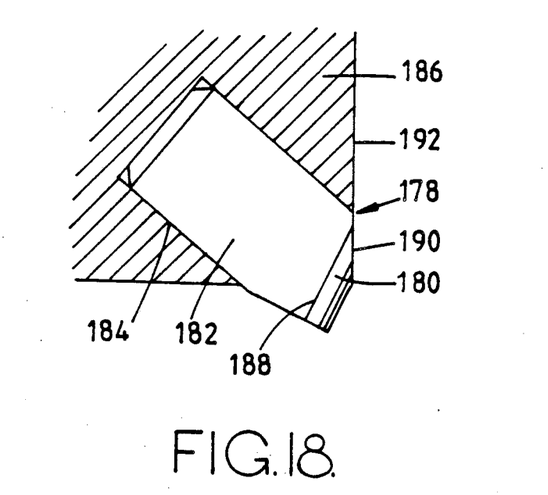
FIG. 18 is a diagrammatic side elevation of a cutting structure utilising a cutting element produced from an intermediate structure similar to that of FIG. 17.

FIG. 18 is a diagrammatic side elevation of a cutting structure 178 utilising a cutting element manufactured by a method similar to that shown in FIG. 17. In this case the cutting element 180 is bonded to a stud 182 received in a socket 184 in a blade 186 on the bit body. The stud 182 is so positioned and orientated, and the surface 188 on which the cutting element is mounted is also so orientated, that the inclined surface 190 of the cutting element 180 is substantially co-planar with the leading surface 192 of the blade 186. Such arrangement may have the advantage that it does not provide significant discontinuities on the leading surface of the blade where debris may lodge or which may encourage erosion of the bit body.

FIG. 19 illustrates an example of how two cutting elements in accordance with FIG. 7 or FIG. 8 can be manufactured.

In this case the intermediate structure 194 comprises a circular disc of tungsten carbide in which are embedded two curved diamond layers 196 and 198, the two diamond layers being spaced apart both diametrically and with respect to the thickness of the intermediate structure. The intermediate structure may then be cut into two pieces by a straight cut as indicated at 200. Each of the two pieces then comprises a cutting element, or a body suitable for conversion to a cutting element.

We claim:

1. A cutting element for a rotary drill bit comprising a layer of polycrystalline diamond material having a front face and a rear face, a backing layer of less hard material bonded to the rear face of the diamond layer, and a front layer of less hard material bonded to the front face of the diamond layer and extending across at least the major part thereof, the front layer being thinner than the backing layer, at least in the vicinity of the cutting edge, and the backing layer, diamond layer and front layer constituting a preformed structure in which the layers have been bonded together in a high temperature, high pressure press.

2. A cutting element according to claim 1, wherein the front layer of the cutting element extends across substantially the whole of the diamond layer.

3. A cutting element according to claim 1, wherein the diamond layer is substantially continuous.

4. A cutting element according to claim 1, wherein the diamond layer is formed with a plurality of apertures into which extends the material of the front and/or backing layer.

5. A cutting element according to claim 1, wherein the diamond layer comprises a plurality of discrete and separate elements spaced apart in a common plane so as to provide between the elements spaces into which extends the material of the front and/or backing layers.

6. A cutting element according to claim 1, wherein the diamond layer extends across only a part of the backing layer and the front layer respectively.

7. A cutting element according to claim 6, wherein the portions of the backing layer and front layer across which the diamond layer does not lie extend across the peripheral edge of the diamond layer and are bonded together.

8. A cutting element according to claim 1, wherein the front and backing layers are formed of the same material.

9. A cutting element according to claim 1, wherein the diamond layer lies in a substantially flat plane.

10. A cutting element according to claim 1, wherein the front and/or rear surface of the diamond layer is convexly or concavely curved.

11. A cutting element according to claim 1, wherein the diamond layer is of substantially constant thickness.

12. A cutting element according to claim 1, wherein the general plane of the diamond layer is disposed at an angle to the general plane of the front surface of the front layer.

13. A cutting element according to claim 12, wherein the front surface of the diamond layer intersects the front surface of the front layer adjacent a peripheral edge of the front layer.

14. A cutting element according to claim 1, wherein the rear surface of the backing layer is substantially parallel to the front surface of the front layer.

15. A cutting structure for a rotary drill bit comprising a cutting element bonded to a carrier, the cutting element comprising a layer of polycrystalline diamond material having a front face and a rear face, a backing layer of less hard material bonded to the rear face of the diamond layer, and a front layer of less hard material bonded to the front face of the diamond layer and extending across at least the major part thereof, the front layer being thinner than the backing layer, at least in the vicinity of the cutting edge, and the backing layer, diamond layer and front layer constituting a preformed structure in which the layers have been bonded together in a high temperature, high pressure press.

16. A rotary drill bit having an operating surface on which are mounted a plurality of cutting elements, at least certain of the cutting elements each comprising a layer of polycrystalline diamond material having a front face and a rear face, a backing layer of less hard material bonded to the rear face of the diamond layer, and a front layer of less hard material bonded to the front face of the diamond layer and extending across at least the major part thereof, the front layer being thinner than the backing layer, at least in the vicinity of the cutting edge, and the backing layer, diamond layer and front layer constituting a preformed structure in which the layers have been bonded together in a high temperature, high pressure press.

17. A method of forming a cutting element for use in a rotary drill bit comprising the steps of forming in a high temperature, high pressure press an interim structure comprising a layer of polycrystalline diamond material having a front face and rear face, a backing layer of less hard material bonded to the rear face of the diamond layer, and a front layer of less hard material bonded to the front face of the diamond layer and extending across at least the major part thereof, removing the interim structure from the press and then removing from the interim structure at least part of the front layer.

18. A method according to claim 17, including the step of removing at least part of the front layer by grinding.

19. A method according to claim 17, wherein sufficient of the front layer is removed to reveal at least part of the front surface of the diamond layer.

20. A method according to claim 17, wherein the interim structure is of substantially constant thickness and has substantially flat front and rear surfaces.

21. A method according to claim 17, wherein the front face of the diamond layer is concavely curved and sufficient of the front layer is removed to provide a front layer of substantially constant thickness, having a concave front surface, over at least a part of the diamond layer.

22. A method according to claim 17, wherein the front face of the diamond layer is concavely curved and sufficient of the front layer is removed to reveal at least a portion of the concave front face of the diamond layer.

23. A method according to claim 17, including the step of bonding the interim structure to a carrier before removing from the interim structure said at least part of the front layer.

24. A cutting element for a rotary drill bit comprising a layer of polycrystalline diamond material having a front face and a rear face, a backing layer of less hard material bonded to the rear face of the diamond layer, and a front layer of less hard material bonded to the front face of the diamond layer and extending across at least the major part thereof, the front layer being thinner than the backing layer, at least in the vicinity of the cutting edge, and being formed of the same material as the backing layer.

25. A cutting element according to claim 24, wherein the front layer of the cutting element extends across substantially the whole of the diamond layer.

26. A cutting element according to claim 24, wherein the diamond layer is substantially continuous.

27. A cutting element according to claim 24, wherein the diamond layer is formed with a plurality of apertures into which extends the material of the front and/or backing layer.

28. A cutting element according to claim 24, wherein the diamond layer comprises a plurality of discrete and separate elements spaced apart in a common plane so as to provide between the elements spaces into which extends the material of the front and/or backing layers.

29. A cutting element according to claim 24, wherein the diamond layer extends across only a part of the backing layer and the front layer respectively.

30. A cutting element according to claim 29, wherein the portions of the backing layer and front layer across which the diamond layer does not lie extend across the peripheral edge of the diamond layer and are bonded together.

31. A cutting element according to claim 24, wherein the diamond layer lies in a substantially flat plane.

32. A cutting element according to claim 24, wherein the front and/or rear surface of the diamond layer is convexly or concavely curved.

33. A cutting element according to claim 24, wherein the diamond layer is of substantially constant thickness.

34. A cutting element according to claim 24, wherein the general plane of the diamond layer is disposed at an angle to the general plane of the front surface of the front layer.

35. A cutting element according to claim 34, wherein the front surface of the diamond layer intersects the front surface of the front layer adjacent a peripheral edge of the front layer.

36. A cutting element according to claim 24, wherein the rear surface of the backing layer is substantially parallel to the front surface of the front layer.

37. A cutting structure for a rotary drill bit comprising a cutting element bonded to a carrier, the cutting element comprising a layer of polycrystalline diamond material having a front face and a rear face, a backing layer of less hard material bonded to the rear face of the diamond layer, and a front layer of less hard material bonded to the front face of the diamond layer and extending across at least the major part thereof, the front layer being thinner than the backing layer, at least in the vicinity of the cutting edge, and being formed of the same material as the backing layer.

38. A rotary drill bit having an operating surface on which are mounted a plurality of cutting elements, at least certain of the cutting elements each comprising a layer of polycrystalline diamond material having a front face and a rear face, a backing layer of less hard material bonded to the rear face of the diamond layer, and a front layer of less hard material bonded to the front face of the diamond layer and extending across at least the major part thereof, the front layer being thinner than the backing layer, at least in the vicinity of the cutting edge, and being formed of the same material as the backing layer.

* * * * *